(12) United States Patent
Beekman et al.

(10) Patent No.: US 12,100,524 B2
(45) Date of Patent: Sep. 24, 2024

(54) DUAL-FUNCTION RADIATION SHIELDING FOR DOWNHOLE TOOL

(71) Applicant: Schlumberger Technology Corporation, Sugar Land, TX (US)

(72) Inventors: Sicco Beekman, Houston, TX (US); Justin Mlcak, Richmond, TX (US)

(73) Assignee: Schlumberger Technology Corporation, Sugar Land, TX (US)

( * ) Notice: Subject to any disclaimer, the term of this patent is extended or adjusted under 35 U.S.C. 154(b) by 0 days.

(21) Appl. No.: 18/006,043

(22) PCT Filed: Jul. 23, 2021

(86) PCT No.: PCT/US2021/070937
§ 371 (c)(1),
(2) Date: Jan. 19, 2023

(87) PCT Pub. No.: WO2022/020856
PCT Pub. Date: Jan. 27, 2022

(65) Prior Publication Data
US 2023/0352202 A1 Nov. 2, 2023

Related U.S. Application Data

(60) Provisional application No. 63/055,914, filed on Jul. 24, 2020.

(51) Int. Cl.
*G21F 1/08* (2006.01)
*E21B 47/01* (2012.01)
*G01V 5/12* (2006.01)

(52) U.S. Cl.
CPC ............ *G21F 1/08* (2013.01); *G01V 5/12* (2013.01); *E21B 47/01* (2013.01)

(58) Field of Classification Search
CPC ..... G21F 1/08; G21F 3/00; G01V 5/12; E21B 47/01; E21B 47/017; E21B 47/0175; E21B 47/013
See application file for complete search history.

(56) References Cited

U.S. PATENT DOCUMENTS

| | | | |
|---|---|---|---|
| 7,772,545 B2 | 8/2010 | Galford | |
| 7,991,111 B2 | 8/2011 | Wraight et al. | |
| 9,575,189 B2 * | 2/2017 | Groves | ................ G01T 1/2006 |
| 10,210,959 B2 | 2/2019 | Stevick | |

(Continued)

FOREIGN PATENT DOCUMENTS

| | | |
|---|---|---|
| KR | 1020180012899 A | 2/2018 |
| WO | 2017105269 A1 | 6/2017 |

OTHER PUBLICATIONS

International Preliminary Report on Patentability issued in PCT Application PCT/US2021/070937 dated Feb. 2, 2023, 7 pages.

(Continued)

*Primary Examiner* — Christopher J Sebesta
*Assistant Examiner* — Yanick A Akaragwe
(74) *Attorney, Agent, or Firm* — Jeffrey D. Frantz

(57) ABSTRACT

A downhole tool is provided that includes radiation shielding using a material that is lighter, stronger, less expensive, and/or more commercially available than tungsten radiation shielding. Such a down-hole tool may include an electronic radiation generator that emits photons to through a source window located on an outer surface of the downhole tool. A detector may detect at least some of the photons through a detector window. Radiation shielding of the downhole tool may attenuate photons that travel from the electronic radiation generator toward the detector without passing through the detector window. The radiation shielding may include a material that has a density less than 10.5 g/cc and an element of atomic number greater than 40.

20 Claims, 7 Drawing Sheets

(56) References Cited

U.S. PATENT DOCUMENTS

| | | | |
|---|---|---|---|
| 2006/0102834 A1 | 5/2006 | Mickael | |
| 2009/0147907 A1 | 6/2009 | Wraight | |
| 2010/0084132 A1* | 4/2010 | Noya | E21B 17/206 166/241.5 |
| 2014/0284503 A1* | 9/2014 | Stevick | G21H 5/02 250/515.1 |
| 2015/0053393 A1* | 2/2015 | Ortiz | G01V 5/10 166/66 |
| 2016/0274038 A1* | 9/2016 | Brady | E21B 47/113 |

OTHER PUBLICATIONS

International Search Report and Written Opinion issued in PCT Application PCT/US2021/070937, dated Nov. 17, 2021 (10 pages).

Ellis, Darwin V. and Julian M. Singer, Well Logging for Earth Scientists. 2nd ed. Springer, 2008. p. 247-258 and 289-307. 2008.

Davis, J.R., ed. Metals Handbook: Desk Edition. 2nd ed., ASM International, 1998. p. 611-612, 629.

National Institute of Standards and Technology, Physics Measurement Laboratory (Dec. 7, 2016). NIST XCOM: Element/Compound/Mixture Selection. Retrieved on Feb. 2, 2023 from http://physics.nist.gov/PhysRefData/Xcom/html/xcom1.html (1 page).

Substantive Exam issued in Saudi Arabia Patent Application No. 523442304 dated Nov. 2, 2023, 11 pages.

Alim, A., "A comprehensive study on radiation shielding characteristics of Tin-Silver, Magnesium-R, Hastelloy-B, Hastelloy-X and Dilver-P alloys", Applied Physics A, 2020, 126:262, 19 pages.

Extended Search Report issued in European Patent Application No. 21845717.4 dated Jun. 21, 2024, 7 pages.

* cited by examiner

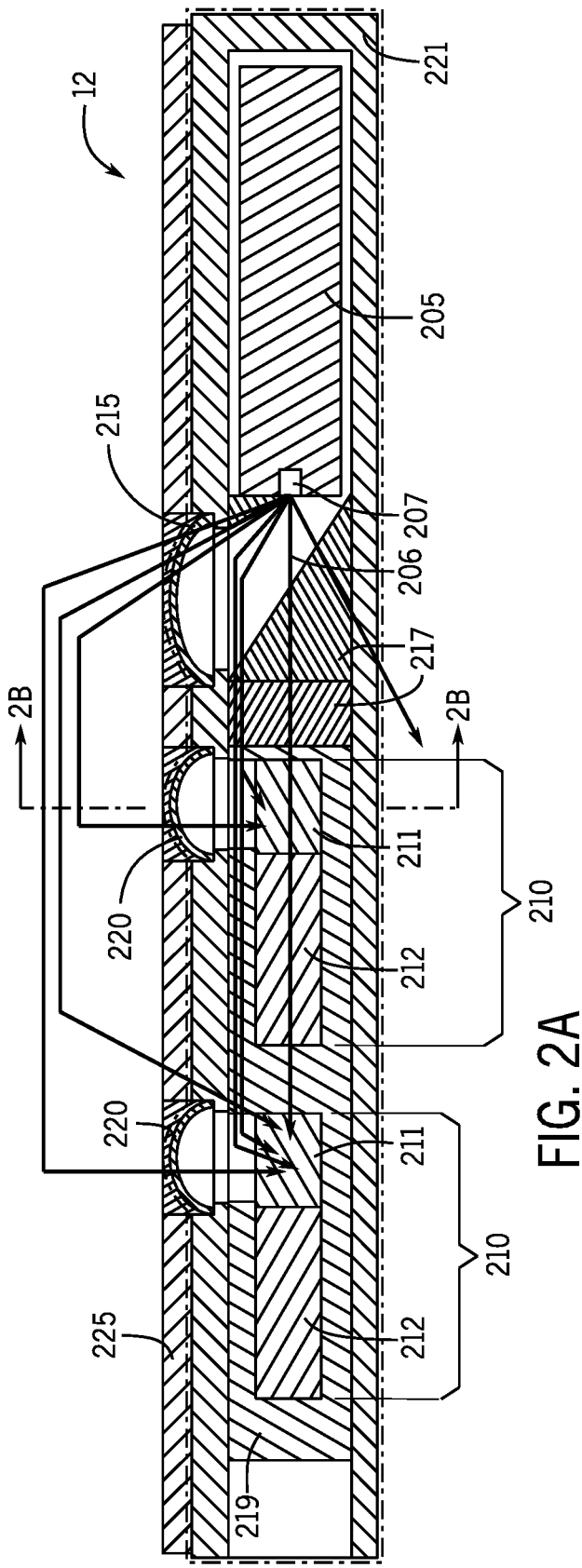
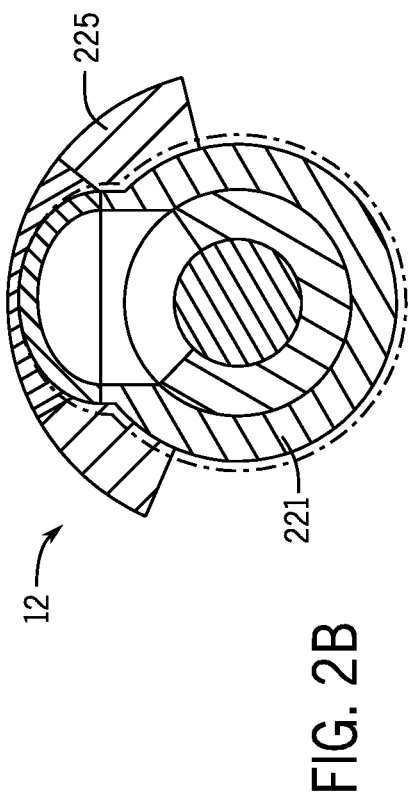
FIG. 2A
FIG. 2B

DUAL-FUNCTION RADIATION SHIELDING FOR DOWNHOLE TOOL

CROSS REFERENCE PARAGRAPH

This application is a National Stage of International Application No. PCT/US2021/070937, filed Jul. 23, 2021, which claims the benefit of U.S. Provisional Application No. 63/055,914, entitled "Dual-Function Radiation Shielding for Downhole Tool," filed Jul. 24, 2020, the disclosures of which are hereby incorporated herein by reference.

BACKGROUND

This disclosure relates generally to downhole tools and, more specifically, to radiation shielding for downhole tools that identify material properties using radiation.

This section is intended to introduce the reader to various aspects of art that may be related to various aspects of the present techniques, which are described and/or claimed below. This discussion is believed to be helpful in providing the reader with background information to facilitate a better understanding of the various aspects of the present disclosure. Accordingly, it should be understood that these statements are to be read in this light, and not as an admission of any kind.

Producing hydrocarbons from a wellbore drilled into a geological formation is a remarkably complex endeavor. In many cases, decisions involved in hydrocarbon exploration and production may be informed by measurements from downhole well-logging tools that are conveyed into the wellbore. The tools may be used to infer properties and characteristics of the geological formation surrounding the wellbore and, thus, make informed decisions. Some such tools may include a radiation generator, to irradiate the geological formation with nuclear or photonic radiation, and sensors to make inferences from the wellbore's response to the radiation.

In general, a detector in the downhole tool is used to detect the radiation that has interacted with the geological formation. The signal from the detector may be used to identify certain material properties of the geological formation at that depth in the wellbore, such as porosity, hydrogen content, lithology, or the like. But if radiation that has not interacted with the geological formation strikes the detector, that radiation may not provide useful information about the geological formation, and thus may be considered noise. This may occur, for example, when radiation from the downhole tool sometimes passes through the tool directly to the detector. To prevent this from happening, radiation shielding material, principally tungsten and alloys thereof, may be used to attenuate this radiation. While radiation shielding may reduce the amount of radiation noise that strikes the detector, the radiation shielding may substantially increase the size, weight, and cost of the downhole tool.

SUMMARY

A summary of certain embodiments disclosed herein is set forth below. It should be understood that these aspects are presented merely to provide the reader with a brief summary of these certain embodiments and that these aspects are not intended to limit the scope of this disclosure. Indeed, this disclosure may encompass a variety of aspects that may not be set forth below.

For downhole tools that include an electronic radiation generator, such as an x-ray generator, radiation shielding may be made from a lighter, stronger, less expensive, and/or more commercially available material. Thus, even though the lighter, stronger, less expensive, and/or more commercially available material may be less effective at attenuating higher-energy photons emitted from radioisotopic sources such as cesium (e.g., $^{137}$Cs), it has been discovered that the material may be quite effective at attenuating lower-energy photons from electronic radiation generators. The radiation shielding of this disclosure may have a relatively high proportion (e.g., a weight percentage of between about 2.5% to 50%) of a material with a high atomic number and/or may have a density less than about 10.5 g/cc, which is much less dense than tungsten, which has a density of greater than 17 g/cc. In this way, the radiation shielding may not only be lighter, stronger, and/or less expensive, but also may serve a dual function of providing mechanical strength to the tool. For example, the radiation shielding material may be used in a pressure housing, an internal shield, or an external shield.

In one example, a downhole tool has an electronic radiation generator that emits photons through a source window located on an outer surface of the downhole tool, a detector that detects the photons through a detector window, and radiation shielding, with a first material that has a density less than 10.5 g/cc and an element of atomic number greater than 39, that attenuates photons that travel from the electronic radiation generator toward the detector without passing through the detector window.

In a second example, a downhole tool has an x-ray generator that generates x-rays, a radiation detector that detects a portion of the x-rays through a detector window, and radiation shielding, with a metallic alloy that contains one or more elements of atomic number greater than 39 and less than 75 that comprise at least 2.5 weight percent of the metallic alloy, that serves a dual function of providing mechanical support for the downhole tool and attenuating x-rays that do not pass through the detector window.

In a third example, a method of manufacturing a downhole tool includes installing an x-ray generator into a pressure housing, installing an x-ray detector into the pressure housing, and installing a radiation shield between the x-ray generator and the x-ray detector where the radiation shield or the pressure housing, or both, comprise a first material that has a density less than 10.5 g/cc and comprises one or more elements of atomic number greater than 39 at a weight percentage between 2.5 and 50.

Various refinements of the features noted above may be undertaken in relation to various aspects of the present disclosure. Further features may also be incorporated in these various aspects as well. These refinements and additional features may exist individually or in any combination. For instance, various features discussed below in relation to one or more of the illustrated embodiments may be incorporated into any of the above-described aspects of the present disclosure alone or in any combination. The brief summary presented above is intended only to familiarize the reader with certain aspects and contexts of embodiments of the present disclosure without limitation to the claimed subject matter.

BRIEF DESCRIPTION OF THE DRAWINGS

Various aspects of this disclosure may be better understood upon reading the following detailed description and upon reference to the drawings in which:

FIG. 2A is a schematic of an x-ray logging tool showing the paths of escape for x-rays, in accordance with an embodiment;

FIG. 2B is a schematic of the x-ray logging tool of FIG. 2A;

DETAILED DESCRIPTION

Figure 1:
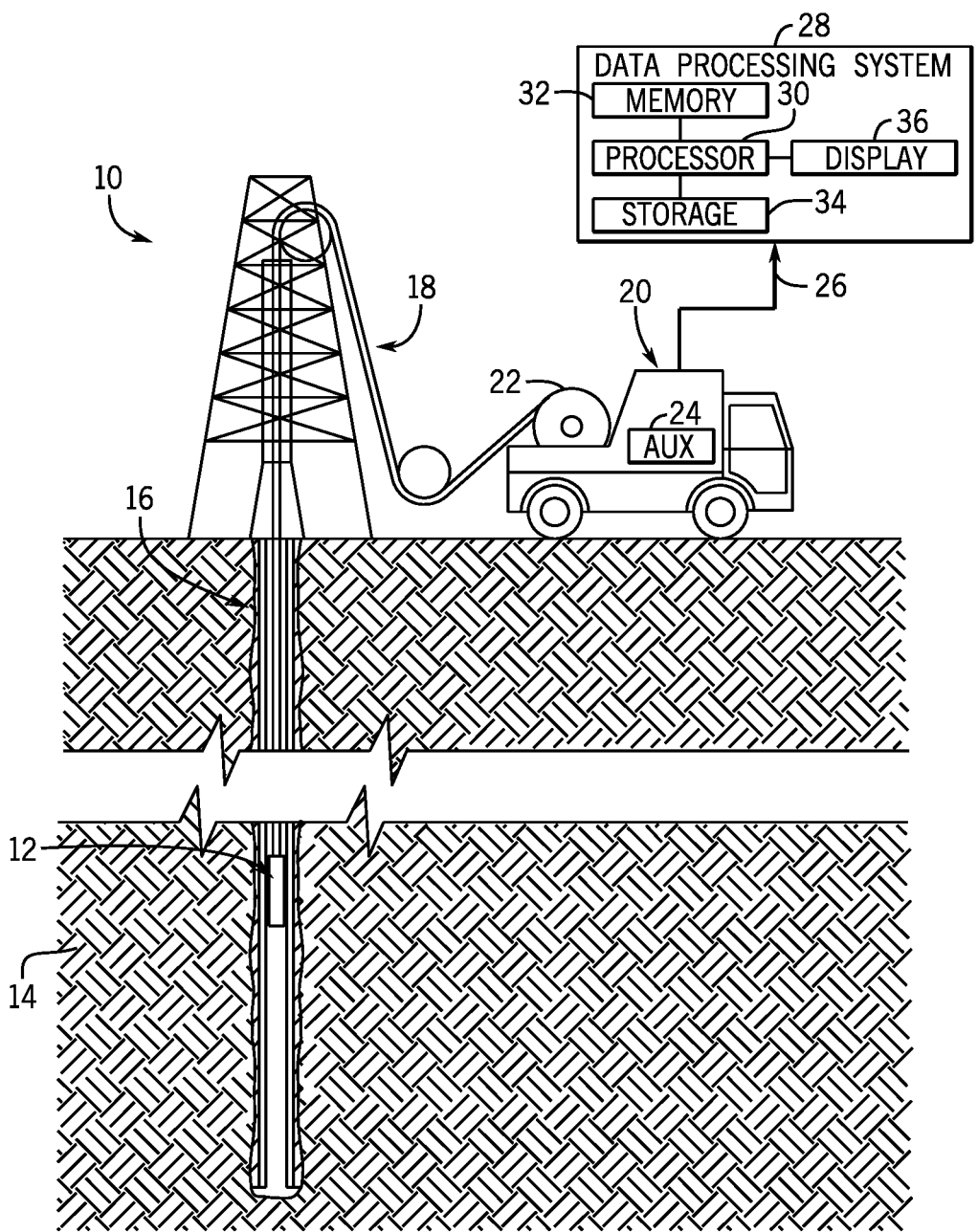
FIG. 1 is a depiction of a well logging operation, in accordance with an embodiment.

One or more specific embodiments of the present disclosure will be described below. These described embodiments are only examples of the presently disclosed techniques. Additionally, in an effort to provide a concise description of these embodiments, all features of an actual implementation may not be described in the specification. It should be appreciated that in the development of any such actual implementation, as in any engineering or design project, numerous implementation-specific decisions must be made to achieve the developers' specific goals, such as compliance with system-related and business-related constraints, which may vary from one implementation to another. Moreover, it should be appreciated that such a development effort might be complex and time consuming, but would nevertheless be a routine undertaking of design, fabrication, and manufacture for those of ordinary skill having the benefit of this disclosure.

When introducing elements of various embodiments of the present disclosure, the articles "a," "an," and "the" are intended to mean that there are one or more of the elements. The terms "comprising," "including," and "having" are intended to be inclusive and mean that there may be additional elements other than the listed elements. Additionally, it should be understood that references to "one embodiment" or "an embodiment" of the present disclosure are not intended to be interpreted as excluding the existence of additional embodiments that also incorporate the recited features.

Certain downhole tools may use an electronic radiation generator, such as an x-ray generator, to emit radiation into a geological formation. Detectors in the downhole tools may measure the radiation once it has interacted with the surrounding materials. Signals from the detectors may be used to identify certain material properties of the geological formation at a particular depth in the wellbore, such as porosity, hydrogen content, lithology, or the like. If radiation that has not interacted with the geological formation strikes a detector, however, that radiation may not provide useful information about the geological formation, and thus may be considered noise. This may occur, for example, when radiation from the downhole tool sometimes passes through the tool directly to the detector. To prevent this from happening, radiation shielding material, such as tungsten, may be used to attenuate this radiation. Depending on the materials used, radiation shielding may reduce the amount of radiation noise that strikes the detector, but could also substantially increase the size, weight, and cost of the downhole tool.

It is now believed, however, that radiation shielding may be made of materials other than tungsten. For downhole tools that include an electronic radiation generator, such as an x-ray generator, radiation shielding may be made from a lighter, stronger, less expensive, and/or more commercially available material. Thus, even though the lighter, stronger, less expensive, and/or more commercially available material may be less effective at attenuating higher-energy photons emitted from radioisotopic sources such as cesium (e.g., $^{137}$Cs), it has been discovered that the material may be quite effective at attenuating lower-energy photons from electronic radiation generators. The radiation shielding of this disclosure may have a relatively high proportion (e.g., a weight fraction of between about 2.5% to 50%) of a material with an atomic number higher than 39 and lower than 75 and has or may have a density less than about 10.5 g/cc, which is much less dense than tungsten, which has a density of greater than 17 g/cc. In this way, the radiation shielding may not only be lighter, stronger, and/or less expensive, but also may serve a dual function of providing mechanical strength to the tool. For example, the radiation shielding material may be used in a pressure housing, an internal shield, or an external shield.

In this way, the radiation shielding of this disclosure may be particularly well suited to downhole tools that emit radiation from an electronic photonic radiation generator, such as an x-ray generator, rather than a monoenergetic radioisotopic source. A monoenergetic radioisotopic source, such as cesium (e.g., $^{137}$Cs), emits gamma rays at a single energy level. The single energy level may be relatively high (e.g., 662 keV in the case of cesium). Thus, highly effective radiation shielding made of materials such as tungsten has been used to attenuate radiation leakage through the downhole tool.

Electronic photonic radiation generators, such as x-ray generators and certain radioisotopes, emit a spectrum of radiation of multiple different energy levels rather than monoenergetic radiation of a single energy level. Moreover, in the case of x-ray generators, the spectrum of radiation may have lower energy than that of many monoenergetic radioisotopic sources (e.g., about 100 keV to 350 keV). Additionally, certain radioisotopes (e.g., $^{133}$Ba) may emit low-energy photons similar to those emitted by an x-ray generator. Tungsten also attenuates these energy levels exceptionally well. Other materials (e.g., having a significant weight percentage of atomic numbers higher than 39 and lower than 75, and/or densities lower than 10.5 g/cc) have been identified, however, that do not attenuate higher-energy photons (e.g., gamma-rays) as well as tungsten, but do attenuate lower-energy photons (e.g., x-rays) such as those emitted by electronic photon generators. By at least partially replacing some of the radiation shielding formed from materials such as tungsten with materials having atomic numbers lower than 75 that attenuate lower-energy photons, a downhole tool that includes an electronic radiation generator may have shielding that is lighter, stronger, less expensive, and/or more available to manufacture.

With the foregoing in mind, FIG. 1 illustrates a well-logging system 10 that may employ the systems and methods of this disclosure. The well-logging system 10 may be used to convey a downhole tool 12 through a geological formation 14 via a wellbore 16. In the example of FIG. 1, the downhole tool 12 is conveyed on a cable 18 via a logging winch system (e.g., vehicle) 20. Although the logging winch system 20 is schematically shown in FIG. 1 as a mobile logging winch system carried by a truck, the logging winch system 20 may be substantially fixed (e.g., a long-term installation that is substantially permanent or modular). Any suitable cable 18 for well logging may be used. The cable 18 may be spooled and unspooled on a drum 22 and an auxiliary power source 24 may provide energy to the logging winch system 20 and/or the downhole tool 12.

Moreover, while the downhole tool 12 is described as a wireline downhole tool, it should be appreciated that any suitable conveyance may be used. For example, the downhole tool 12 may instead be conveyed as a logging-while-drilling (LWD) tool as part of a bottom-hole assembly (BHA) of a drill string, conveyed on a slickline or via coiled tubing, and so forth. For the purposes of this disclosure, the downhole tool 12 may be any suitable downhole tool 12 using a high-voltage power supply, for example, to generate nuclear or photonic radiation (e.g., x-rays) within the wellbore 16 (e.g., downhole environment). As discussed further below, the downhole tool 12 may receive energy, for example, from the auxiliary power source 24 or other store/source of sufficient electrical energy and transform the voltage for use in producing nuclear or photonic radiation (e.g., x-rays). Further, the supplied energy may be transformed to higher voltages within the wellbore 16, for example, via a high-voltage power supply within or proximate the downhole tool 12.

Control signals 26 may be transmitted from a data processing system 28 to the downhole tool 12, and data signals 26 related to the response of the formation 14 may be returned to the data processing system 28 from the downhole tool 12. The data processing system 28 may be any electronic data processing system 28 that can be used to carry out the systems and methods of this disclosure. For example, the data processing system 28 may include a processor 30, which may execute instructions stored in memory 32 and/or storage 34. As such, the memory 32 and/or the storage 34 of the data processing system 28 may be any suitable article of manufacture that can store the instructions. The memory 32 and/or the storage 34 may be read-only memory (ROM), random-access memory (RAM), flash memory, an optical storage medium, or a hard disk drive, to name a few examples. A display 36, which may be any suitable electronic display, may display images generated by the processor 30. The data processing system 28 may be a local component of the logging winch system 20 (e.g., within the downhole tool 12), a remote device that analyzes data from other logging winch systems 20, a device located proximate to the drilling operation, or any combination thereof In some embodiments, the data processing system 28 may be a mobile computing device (e.g., tablet, smart phone, or laptop) or a server remote from the logging winch system 20.

To avoid a using a radioisotopic radiation source, an electronic radiation generator may be used. FIG. 2 is a schematic view of a portion of the downhole tool 12 that includes an x-ray generator 205. The x-ray generator 205 may be any type of device that produces and emits photons 206 by generating voltage (e.g., 150 keV, 250 keV, etc.) to form an electric field. The source of the photons 206 produced by the x-ray generator 205 may be at a target 207 located at one end of the x-ray generator 205. The electric field is generated between the target 207 and one or more cathodes located within the x-ray generator 205.

To determine the properties of the geological formation 14, the downhole tool 12 may emit photons 206 into the geological formation 14 to interact with the geological formation. The photons 206 are then detected by detectors 210 located opposite the x-ray generator 205 within the downhole tool 12. For example, the target 207 may emit photons 206 as high-energy photons at an energy sufficient to cause at least a portion of the photons 206 to scatter off elements of the geological formation 14 (e.g., through Compton scattering) and to be absorbed by the detectors 210. The detector 210 may include a scintillator 211 that absorbs the photons 206 and emits light based on the energy of the absorbed photons. For example, each emission of light may count as a detected photon 206 (e.g., thereby adding one to a count rate of the detector 210). Further, the detector 210 may include a photomultiplier 212 operatively coupled to the scintillator 211 to detect the light emitted by the scintillator. The measurement of the formation density is made by counting the number and energy level of photons 206 striking each detector 210 after being emitted by the target 207 and passing through the formation.

In the illustrated embodiment, the photons 206 emitted by the target 207 are directed through a source window 215 located on the outer surface of the downhole tool 12. While the embodiment shows a curved source window 215, the source window may also be flat or any suitable shape to allow photons 206 to pass through mostly uninhibited. The source window 215 may be made out of any material such as metal, glass, or plastic. Furthermore, internal radiation shielding 217 may divide the detectors 210 from the target 207 to restrict direct passage of photons 206 from the target 207 to the detectors 210 (e.g., internal leakage). The internal radiation shielding 217 may be located below the source window 215 to ensure the majority of photons 206 travel through the source window 215. The internal radiation shielding 217 may be made out of a high density material to restrict photon 206 passage. However, radiation leakage may still occur as indicated by the photon 206 travel paths. Internal radiation leakage may occur through the housing, internal radiation shielding 217, and air gaps located within the downhole tool 12.

The detectors 210 may be supported by a chassis 219 within the downhole tool 12. Furthermore, the chassis 219 may provide additional shielding against leaked photons 206 traveling through the downhole tool 12. The chassis 219 may surround the detectors 210 and may have openings adjacent to the scintillator 211 and below detector windows 220. The detector windows 220 may be similar to the source window 215 and allow the photons 206 to re-enter the downhole tool 12. The detector windows 220 are placed in such a manner that allow a majority of the photons 206 to enter the downhole tool 12 and contact the detectors 210.

In one or more embodiments, the downhole tool 12 is enclosed by a pressure housing 221 that surrounds the inner components of the downhole tool 12. The pressure housing 221 may secure all of the components to ensure minimal movement during operation and field use of the downhole tool 12. The pressure housing 221 may provide a small amount of shielding for the interior components of the downhole tool 12 from photons 206. More efficient shielding may be provided by an external shield 225 attached to the pressure housing 221 that covers a portion of the downhole tool 12. The external shield 225 may surround the portion of the downhole tool 12 that is exposed to the photons, such as the surface including the source window 215 and the detector windows 220. The material of the external shield 225 may have a relatively high density and a high atomic number in order to scatter the photons 206 or absorb photons that contact the external shield 225.

FIG. 2 further shows a cross section B-B of the downhole tool 12. The downhole tool 12 is a cylindrical design with the pressure housing 221 surrounding the internal components of the downhole tool 12. As shown in cross section B-B, the external shield 225 covers a portion of the downhole tool 12. An external shield 225 may not be required to cover the entirety of the downhole tool 12 as the photons 206 generally come in contact with only a portion of the downhole tool 12.

Figure 3:
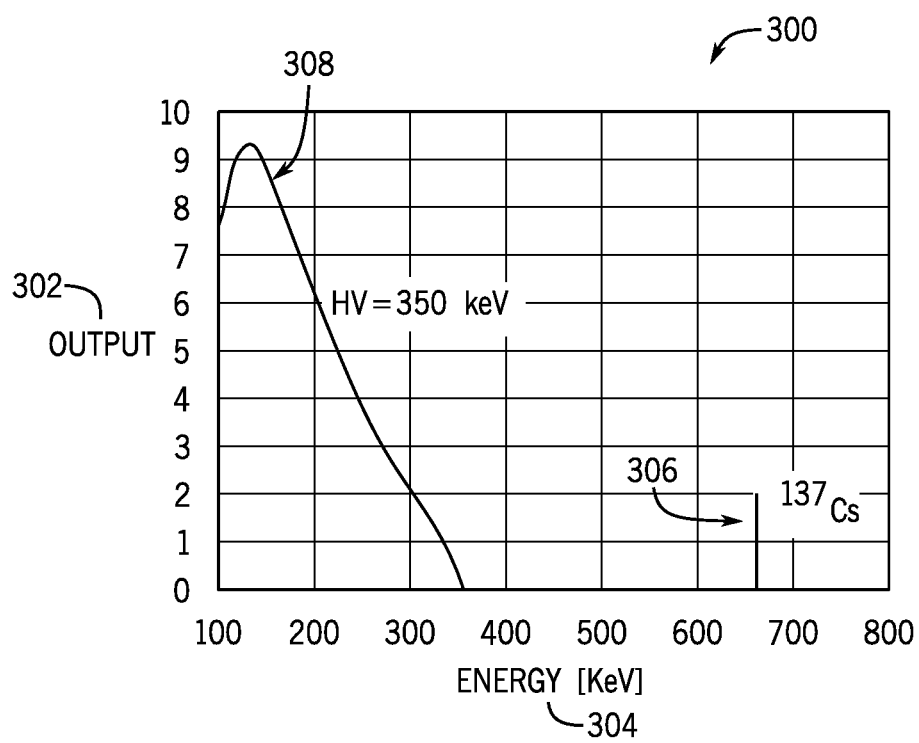
FIG. 3 is a diagram of a graph comparing a spectrum of radiation from an x-ray generator with radiation from a Cesium radioisotopic source, in accordance with an embodiment.

With the following in mind, FIG. 3 shows a graph 300 comparison of an x-ray generator spectrum and a radioisotope source. The graph 300 is a plot of an output 302 (i.e., photons leaving the x-ray generator) against energy 304 (i.e., the energy of the source) measured in keV. Cesium (e.g., $^{137}$Cs) 306 has a single energy 304 level of 662 keV. As such, radiation from the Cesium 306 source initially only has Compton scattering interactions. However, the energy 304 level for an x-ray generator 308 ranges from about 100 keV to 350 keV. As such, photons leaving the x-ray generator may have Compton scattering interactions and photoelectric interactions with a scattering medium. As the photons scatter at least once in the formation and return to the downhole tool 12, the energy 304 level is reduced and the entire spectrum is moved to a lower energy with only a negligible number of photons above 200 keV. This may allow photoelectric absorption attenuation mechanisms to become more dominant as a photon has a greater probability of being absorbed if the photon energy 304 is lower. Furthermore, the photons have an increased absorption probability if the atomic number of the scattering material is higher.

As the graph 300 shows, lower source energy changes the traditional approach to shielding nuclear logging tools for density and potential energy measurements. High density material was traditionally the radiation shielding of choice because the radioisotope source was in the Compton scattering energy range. High density materials also have a high atomic number. The density of typical pressure housing materials is slightly less than half that of tungsten alloys which reduces its ability to scatter higher energy photons. Additionally, the effective atomic number of typical pressure housing materials is a factor of 2 to 3 times less than the effective atomic number for tungsten alloys which reduces its ability to absorb low energy photons. Furthermore, high density materials may not be good candidates for pressure housing materials because they have lower strength, less ductility, higher cost, and poorer corrosion resistance compared to typical housing materials.

When the source energy 304 is reduced and much of the spectrum is below 200 keV, as in the case of an x-ray generator 308, it is possible to use shielding materials with a higher atomic number, Z, and a density that is not extremely high because the attenuation of the lower energy photons is dominated by photoelectric absorption.

Figure 4:
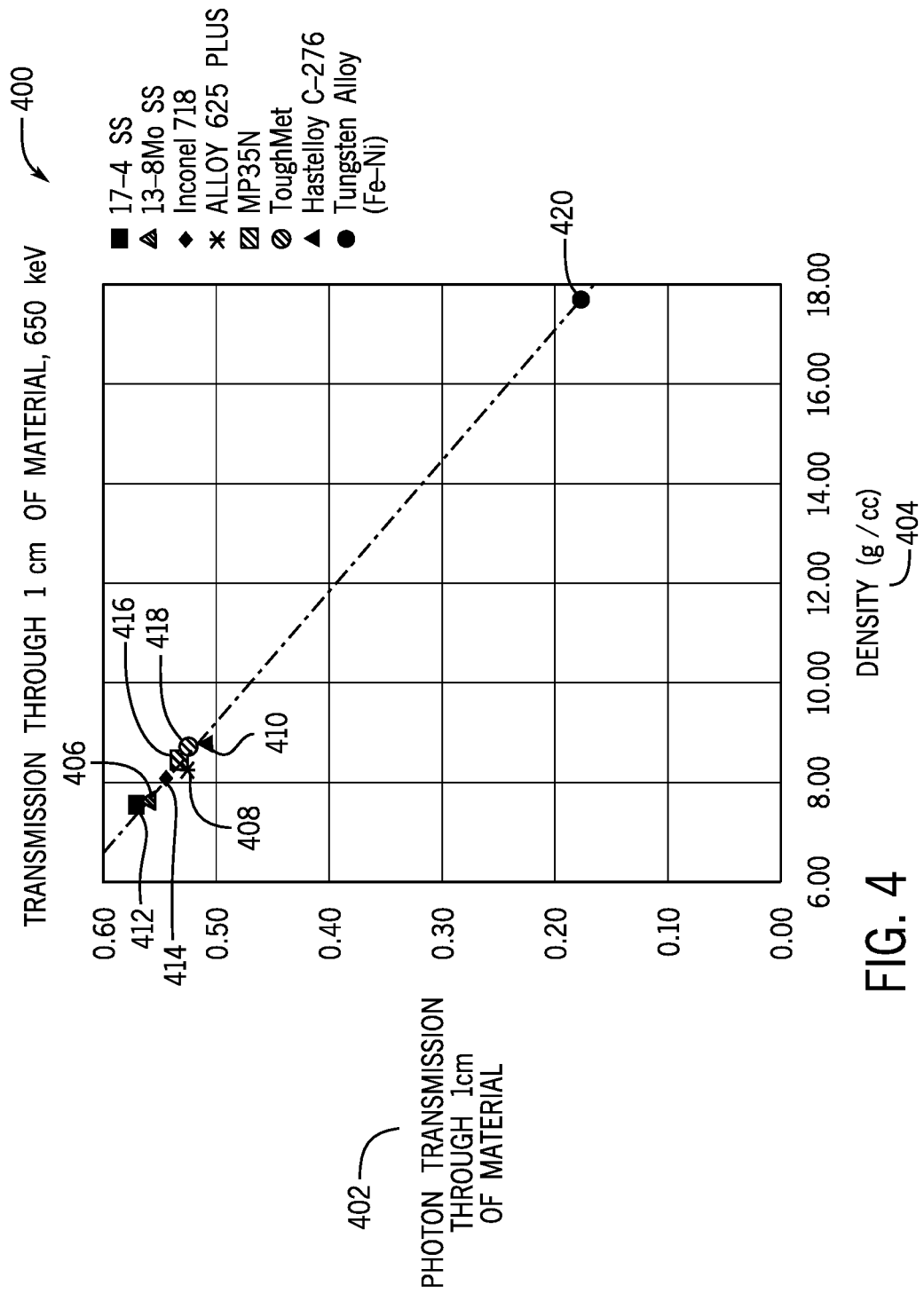
FIG. 4 is a graph identifying photon transmission through 1 cm of various metallic alloys at 650 keV, in accordance with an embodiment.

To further illustrate this, FIG. 4 shows a graph 400 showing the transmission of photons through 1 cm of material at 650 keV. Graph 400 relates to the use of Cesium or any other high energy radioisotope as a source for emitting photons. Graph 400 plots a list of materials based on the photon transmission 402 through 1 cm of material against the density 404 of the material measured in g/cc. The materials plotted are 13-8 Mo SS 406, Alloy 625 Plus 408, Hastelloy C-276 410, 17-4 SS 412, Inconel 718 414, MP35N 416, ToughMet 418, and Tungsten Alloy (Fe-Ni) 420. The selection of some of the materials, such as Hastelloy C-276 410 and TougMet 418, to plot on the graph 400 are due to the prominent use of these materials in typical downhole tools. Furthermore, the materials 406, 408, 410, 412, 414, 416, 418, and 420 include a large proportion of at least one alloy element (between 2.5 and 50 wt %) that has an atomic number above 39. As shown in this embodiment, the Tungsten Alloy (Fe-Ni) 420 has a higher density than the other materials plotted on the graph 400. The higher density of the Tungsten Alloy (Fe-Ni) 420 allows for the least amount of photon transmission 402 through 1 cm of this material at 650 keV at levels around 0.18. The remaining materials 406, 408, 410, 412, 414, 416, and 418 have much lower densities than Tungsten Alloy (Fe-Ni) 420, but allow for much higher photon transmissions 402 through 1 cm of material at 650 keV at levels greater than 0.50. As such, there is a strong relationship between photon transmission 402 and material density through a given thickness of material at a higher energy of 650 keV where Compton scattering dominates. At high energy levels, such as 650 keV, Tungsten Alloy (Fe-Ni) 420 may be the only suitable material option for internal and external shielding.

Figure 5:
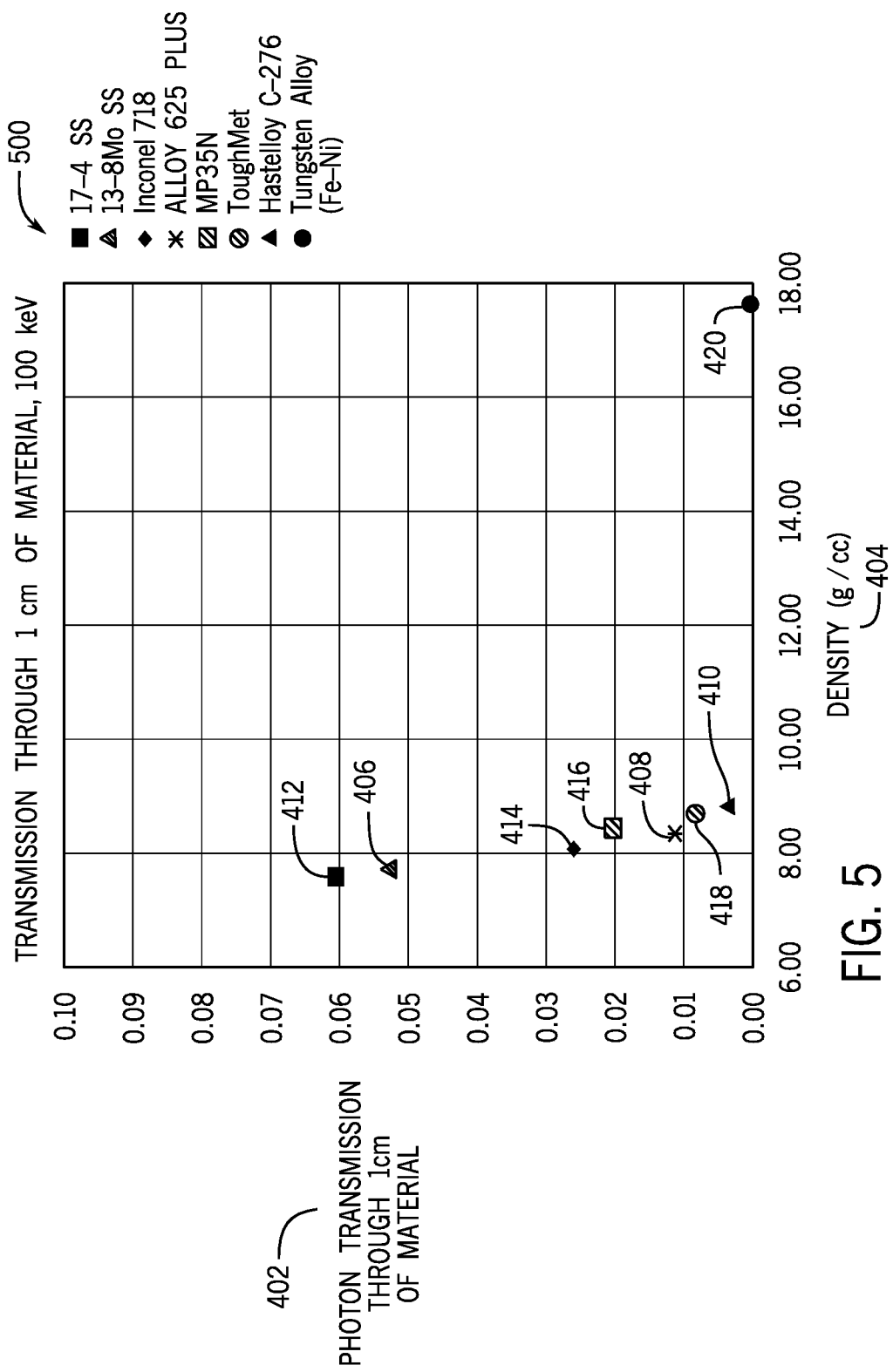
FIG. 5 is a graph identifying photon transmission through 1 cm of various metallic alloys at 100 keV, in accordance with an embodiment.

FIG. 5 shows a graph 500 showing the transmission of photons through 1 cm of material at 100 keV. Graph 500 relates to the use of an x-ray generator as a source for emitting photons. Graph 500 plots a list of materials based on the photon transmission 402 through 1 cm of material against the density 404 of the material measured in g/cc. The materials plotted are 13-8 Mo Stainless Steel (SS) 406, Alloy 625 Plus 408, Hastelloy C-276 410, 17-4 SS 412, Inconel 718 414, MP35N 416, ToughMet 418, and Tungsten Alloy (Fe-Ni) 420. As the materials are the same as the materials plotted in FIG. 4, the densities 404 of the materials remain the same. However, the photon transmission 402 through 1 cm of each of these materials is reduced to levels all below 0.10. In this embodiment, Tungsten Alloy (Fe-Ni) 420 does not allow any photon transmission 402 through 1 cm of the material at 100 keV. As shown by the graph 500, there is no direct relationship between photon transmission 402 and the density 404 of materials at low energies, such as 100 keV. Some materials, such as Hastelloy C-276 410 and ToughMet 418, may have similar densities 404, but the photon transmission 402 may differ by a factor close to 3 due to the difference in effective atomic number.

Figure 6:
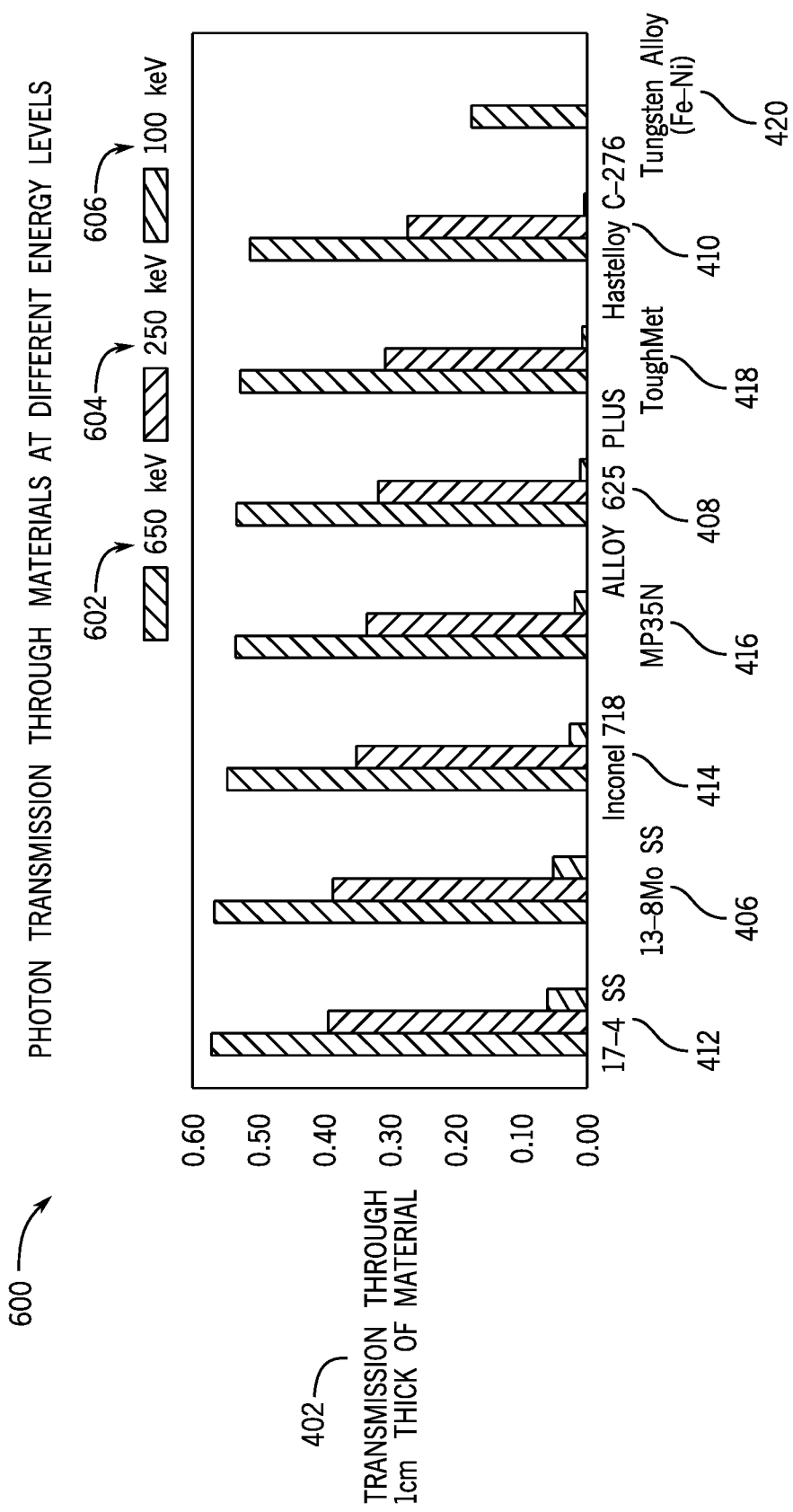
FIG. 6 is a chart identifying photon transmission through 1 cm of various metallic alloys at different energy levels, in accordance with an embodiment.

FIG. 6 further illustrates the difference in photon transmission 402 at different energy levels. As shown in FIG. 6 a graph 600 shows the photon transmission 402 through materials 406, 408, 410, 412, 414, 416, and 418 at 650 keV 602, 250 keV 604, and 100 keV 100. The materials are arranged along the graph 600 based on ascending effective atomic number of the material. The photon transmission 402 through the materials 406, 408, 410, 412, 414, 416, and 418 decreases with decreasing energy 602, 604, and 606. As lower energy x-rays on the order of 250 keV 604 are used as the source of radiation, photon transmission 402 through materials is much less than a radioisotope source (e.g., Cesium), which may have an energy level closer to 650 keV 602. When photons with energy on the order of 250 keV 604 (i.e., photons emitted by x-ray) scatter, the energy will be lessened and the transmission through the materials will be substantially reduced. At lower energy ranges, such as 100 keV 606 and 250 keV 604, photoelectric effect is prominent and, thus, materials with a higher effective atomic number have greater stopping power for photons.

TABLE 1

Density, yield strength, and photon transmission (at different energy levels) for certain downhole alloys

| Material | $\rho_b$ [g/cc] | UNS No. | Yield Strength (ksi) | Photon Transmission (1 cm thick) | | |
|---|---|---|---|---|---|---|
| | | | | 650 keV | 250 keV | 100 keV |
| Tungsten Alloy (Fe—Ni) | 17.72 | N/A | 75 | .18 | .00035 | .000000 |
| Hastelloy C-276 | 8.80 | N10276 | 165 | .51 | .273 | .002726 |
| Inconel 625 Plus | 8.36 | N07716 | 140 | .53 | .317 | .010769 |
| ToughMet 3AT | 8.72 | C72900 | 110 | .52 | .307 | .007959 |
| MP35N | 8.46 | R30035 | 200 | .53 | .334 | .019935 |
| Inconel 718 | 8.09 | N07718 | 150 | .54 | .349 | .025631 |
| 13-8Mo Stainless Steel | 7.69 | S13800 | 190 | .57 | .385 | .052145 |
| 17-4 PH Stainless Steel | 7.61 | S17400 | 150 | .57 | .392 | .060504 |

Table 1 shows the typical density, yield strength, and photon transmission at different energy levels of the materials 406, 408, 410, 412, 414, 416, 418, and 420 appearing in the graph 600. As can be noted, while Tungsten alloy 420 is a suitable material at a higher energy range, such as 650 keV, the material density of Tungsten alloy is over 10.5 g/cc. Thus, Tungsten alloy is not a suitable pressure housing material due to the high density and low yield strength of the material. Furthermore, the other listed materials 406, 408, 410, 412, 414, 416, and 418 all have densities less than 10.5 g/cc. A material such as MP35N 416 may be a suitable pressure housing material for high pressure and high temperature applications as well as $H_2S$ applications. Additionally, Inconel 718 414 may also be a suitable pressure housing material for $H_2S$ applications while 13-8 Mo Stainless Steel 406 may also be suitable for high pressure and high temperature applications.

As such, materials 406, 408, 410, 412, 414, 416, and 418 that may not be effective at a higher energy level, such as 650 keV 602, become more effective for stopping photon transmission 402 at lower energy levels 100 keV 606 and 250 keV 604. The materials may be used on previously described components of the downhole tool 12, such as the pressure housing, the chassis, the internal radiation shielding, or the external shielding. In one or more embodiments, the pressure housing may be made of a suitable material that allows sufficient shielding of the inner components of the downhole tool 12. For example, the pressure housing may be made of Hastelloy C-276 410. Indeed, the pressure housing or other components of the downhole tool 12 may include an austenitic nickel-chromium-based superalloy, a nickel-molybdenum-chromium superalloy, and/or martensitic precipitation hardened stainless steel. This may allow for less material to be used on the internal radiation shielding and the external shielding as the pressure housing may provide sufficient shielding to absorb photons.

Thus, the various components of a downhole tool may include these types of materials —materials containing a relatively large proportion of at least one alloy element (between 2.5 and 50 wt %) that has an atomic number above 39 and materials having a density of less than 10.5 g/cc —to effectively attenuate stray photons from an electronic radiation generator. These materials may be used with or without additional shielding made from tungsten. When used in combination with tungsten shielding, the use of the materials discussed herein may permit less tungsten shielding to be used than otherwise to achieve the same level of photon attenuation. In other words, the downhole tool may contain a smaller amount of tungsten shielding while achieving the same or functionally comparable amount of photon attenuation, as compared to a downhole tool that did not also use a material that contains a relatively large proportion of at least one alloy element (between 2.5 and 50 wt %) that has an atomic number above 40 and a material having a density of less than 10.5 g/cc, as discussed above. Thus, in some embodiments, no tungsten may be used. In other embodiments, less tungsten may be used.

Figure 7:
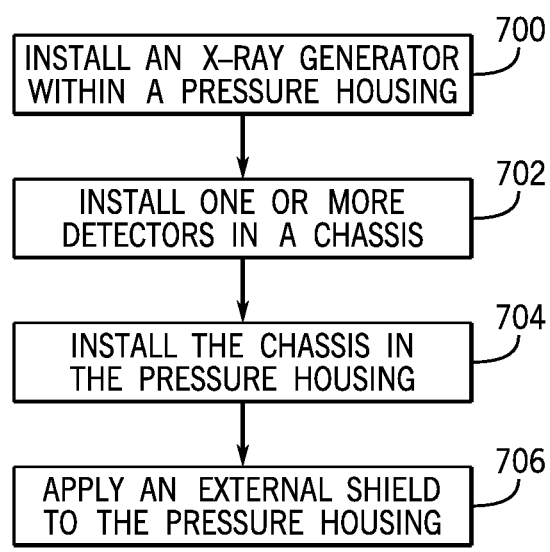
FIG. 7 is a block diagram of a method of constructing a downhole tool, in accordance with an embodiment.

FIG. 7 shows a method for constructing a downhole tool. It should be appreciated that the method of FIG. 7 is provided by way of example, and may be performed in a different order and with more or fewer stages than described here. At process block 700, an x-ray generator may be installed within a pressure housing. The pressure housing may fully enclose the x-ray generator and secure the x-ray generator in place to limit any movement from vibration or operation of the downhole tool. Furthermore, the pressure housing may include an opening and a source window to allow for photons emitted by the x-ray generator to leave the downhole tool. The pressure housing may be made of a suitable material, as discussed above, to allow for absorption of photons at an absorption level that coincides with the material selected. Indeed, by selecting a material that contains a relatively large proportion of at least one alloy element (between 2.5 and 50 wt %) that has an atomic number above 39 and a material having a density of less than 10.5 g/cc, as discussed above, the pressure housing may serve a dual function of providing mechanical support while attenuating undesired x-rays passing through.

At process block 702, one or more detectors are installed in a chassis. The chassis may have one or more openings adjacent to the one or more detectors to allow for the one or more detectors to receive the photons emitted by the x-ray generator. The chassis may enclose the one or more detectors and/or secure the one or more detectors in place to limit any movement from vibration or operation of the downhole tool. The chassis, too, may or may not be formed using a material that contains a relatively large proportion of at least one alloy element (between 2.5 and 50 wt %) that has an atomic number above 39 and a material having a density of less than 10.5 g/cc, as discussed above. The chassis, thus, may additionally or alternatively serve a dual function of providing mechanical support while attenuating undesired x-rays passing through. In some cases, the chassis may also include internal radiation shielding that is formed using a material that contains a relatively large proportion of at least one alloy element (between 2.5 and 50 wt %) that has an atomic number above 39 and a material having a density of less than 10.5 g/cc, as discussed above. There may or may not be additional radiation shielding that contains tungsten, as also discussed above.

At process block 704, the chassis is installed in the pressure housing. The chassis may be located at an opposite end of the pressure housing than the x-ray generator. Furthermore, an internal shield may be installed between the chassis and the x-ray generator to further prevent photon leakage into the downhole tool. The chassis may be fully enclosed with openings and detector windows located adjacent to the one or more detectors.

At process block 706, an external shield is applied to the outer surface of the pressure housing. The external shield may enclose a portion of the pressure housing, in particular, the portion of the pressure housing with the openings designed to allow the photons to enter and leave the detection device. The external shield may be made of a suitable material, as described above, to allow for absorption of photons at an absorption level that coincides with the material selected to further prevent photon leakage into the downhole tool. Indeed, by selecting a material that contains a relatively large proportion of at least one alloy element (between 2.5 and 50 wt %) that has an atomic number above 39 and a material having a density of less than 10.5 g/cc, as discussed above, the external shielding may serve a dual function of providing mechanical support while attenuating undesired x-rays passing through.

The specific embodiments described above have been shown by way of example, and it should be understood that these embodiments may be susceptible to various modifications and alternative forms. It should be further understood that the claims are not intended to be limited to the particular forms disclosed, but rather to cover all modifications, equivalents, and alternatives falling within the spirit and scope of this disclosure.

The imvention claimed is:

1. A downhole tool comprising:
a radiation source configured to emit photons;
a detector configured to detect the photons that pass through a detector window; and
radiation shielding configured to attenuate the photons that travel from the radiation source toward the detector without passing through the detector window, wherein the radiation shielding comprises a metallic alloy that has a density less than 10.5 g/cc and that includes at least 2.5 weight percent of an element of atomic number greater than 39, and wherein the radiation shield is configured to attenuate a count rate caused by photons reaching the detector other than through the detector window to less than 10% of the count rate that would be observed when the tool is disposed in a 2.95 g/cc rock.

2. The downhole tool of claim 1, wherein the element of atomic number greater than 39 is at least 10 weight percent of the metallic alloy.

3. The downhole tool of claim 1, wherein the element of atomic number greater than 39 is less than or equal to 50 weight percent of the metallic alloy.

4. The downhole tool of claim 1, wherein the element of atomic number greater than 39 has an atomic number less than 75.

5. The downhole tool of claim 1, wherein the metallic alloy comprises an austenitic nickel-chromium-based superalloy, a nickel-molybdenum-chromium superalloy, a martensitic precipitation hardened stainless steel, or any combination thereof.

6. The downhole tool of claim 1, wherein the radiation shielding comprises an internal radiation shield disposed between the electronic radiation source and the detector.

7. The downhole tool of claim 6, wherein the internal radiation shield comprises tungsten.

8. The downhole tool of claim 6, wherein the internal radiation shield does not comprise tungsten.

9. The downhole tool of claim 1, wherein the radiation shielding comprises a pressure housing that surrounds the radiation source and the detector.

10. The downhole tool of claim 1, wherein the metallic alloy includes about 2.5 weight percent to about 17 weight percent of the element of atomic number greater than 39.

11. The downhole tool of claim 1, wherein the radiation shielding comprises a thickness of about 1 cm.

12. A downhole tool comprising:
an x-ray generator configured to generate x-rays;
a radiation detector configured to detect a portion of the x-rays through a detector window; and
radiation shielding configured to provide mechanical support for the downhole tool and attenuate x-rays that do not pass through the detector window, wherein the radiation shielding comprises a metallic alloy that contains an element of atomic number greater than 39 and less than 75 that is at least 2.5 weight percent of the metallic alloy, and wherein the radiation shield is configured to reduce a count rate caused by x-rays reaching the detector other than through the detector window to less than 10% of the count rate that would be observed when the tool is disposed in a 2.95 g/cc rock.

13. The downhole tool of claim 12, wherein the metallic alloy has a density of less than 10.5 g/cc.

14. The downhole tool of claim 12, wherein the radiation shielding comprises an external shielding on the downhole tool.

15. The downhole tool of claim 14, wherein the external shielding comprises tungsten.

16. The downhole tool of claim 14, wherein the external shielding does not comprise tungsten.

17. The downhole tool of claim 12, wherein the metallic alloy comprises an austenitic nickel-chromium-based superalloy, a nickel-molybdenum-chromium superalloy, a martensitic precipitation hardened stainless steel, or any combination thereof.

18. A method of manufacturing a downhole tool comprising:
installing an x-ray generator into a pressure housing;
installing an x-ray detector into the pressure housing; and
installing a radiation shield between the x-ray generator and the x-ray detector, wherein the radiation shield or the pressure housing, or both, comprise a first material that has a density less than 10.5 g/cc and comprises an element of atomic number greater than 39 at a weight percentage between 2.5 and 50, and wherein the radiation shield is configured to reduce a count rate caused by x-rays reaching the detector other than through a detector window to less than 10% of the count rate that would be observed when the tool is disposed in a 2.95 g/cc rock.

19. The method of claim 18, wherein the first material comprises an austenitic nickel-chromium-based superalloy, a nickel-molybdenum-chromium superalloy, a martensitic precipitation hardened stainless steel, or any combination thereof.

20. The method of claim 18, comprising installing an external shield to an outer surface of the pressure housing, wherein the external shield comprises the first material.

* * * * *